(12) United States Patent
Pillalamarri et al.

(10) Patent No.: US 8,613,098 B1
(45) Date of Patent: Dec. 17, 2013

(54) METHOD AND SYSTEM FOR PROVIDING A DYNAMIC IMAGE VERIFICATION SYSTEM TO CONFIRM HUMAN INPUT

(75) Inventors: Balasubrahmanyam Pillalamarri, Karnataka (IN); Girish Mallenahally Channakeshava, Karnataka (IN)

(73) Assignee: Intuit Inc., Mountain View, CA (US)

( * ) Notice: Subject to any disclaimer, the term of this patent is extended or adjusted under 35 U.S.C. 154(b) by 679 days.

(21) Appl. No.: 12/495,145

(22) Filed: Jun. 30, 2009

(51) Int. Cl.
*H04L 9/32* (2006.01)
*G06F 17/30* (2006.01)

(52) U.S. Cl.
USPC ...... 726/26; 726/7; 726/16; 726/27; 713/170; 709/217; 709/225

(58) Field of Classification Search
USPC ......... 726/5, 7, 16, 26, 27; 713/170; 709/217, 709/225
See application file for complete search history.

(56) References Cited

U.S. PATENT DOCUMENTS

| | | | |
|---|---|---|---|
| 2004/0015554 A1* | 1/2004 | Wilson | 709/206 |
| 2008/0066014 A1* | 3/2008 | Misra | 715/846 |
| 2008/0127302 A1* | 5/2008 | Qvarfordt et al. | 726/2 |
| 2010/0228804 A1* | 9/2010 | Dasgupta et al. | 707/915 |
| 2010/0262662 A1* | 10/2010 | Wang | 709/206 |

* cited by examiner

*Primary Examiner* — Beemnet Dada
*Assistant Examiner* — Kalish Bell
(74) *Attorney, Agent, or Firm* — McKay and Hodgson, LLP; Philip McKay; Sean P. Lewis

(57) ABSTRACT

A method and system for providing a dynamic image verification system to confirm human input whereby a dynamic verification image that is pictorial in nature, and/or is animated, is displayed as part of a generated image verification test. The user is then asked to describe the pictorial image and/or the animation shown by the dynamic verification image and/or, in one example, respond to the dynamic verification image in a manner appropriate to the dynamic verification image. Any user entering a correct solution, i.e., describing the pictorial image and/or animated action of the dynamic verification image correctly, or, in one example, interacting with the dynamic verification image in an appropriate manner, is presumed to be a human being, and not a computing system or other automated device.

4 Claims, 4 Drawing Sheets

METHOD AND SYSTEM FOR PROVIDING A DYNAMIC IMAGE VERIFICATION SYSTEM TO CONFIRM HUMAN INPUT

BACKGROUND

Herein, spam is defined as the abuse of electronic messaging systems, such as the Internet, to send unsolicited bulk messages indiscriminately. While the most widely recognized form of spam is e-mail spam, the term is applied to similar abuses in other media such as, but not limited to: instant messaging spam, Usenet newsgroup spam, Web search engine spam, spam in blogs, wiki spam, Online classified ads spam, mobile phone messaging spam, Internet forum spam, junk fax transmissions, and file sharing network spam.

Spamming remains economically viable because advertisers have no operating costs beyond the management of their mailing lists, and it is difficult to hold senders accountable for their mass mailings. Because the barrier to entry is so low, spammers are numerous, and the volume of unsolicited mail has become very high. It is estimated that in 2009 the average inbox will sustain 4,403 SPAM hits each year.

Most spam is commercial advertising, often for dubious products, get-rich-quick schemes, or quasi-legal services. As noted above, spam costs the sender very little to send and most of the costs are paid for by the recipient or the carriers rather than by the sender. One particularly nasty variant of e-mail spam is sending spam to mailing lists (public or private e-mail discussion forums.) Because many mailing lists limit activity to their subscribers, spammers will use automated tools to subscribe to as many mailing lists as possible, so that they can grab the lists of addresses, or use the mailing list as a direct target for their attacks. A related, or more general, form of spam is to use computer programs and/or routines to automatically fill in other web-forms and/or make automated web-form submissions.

The costs of spam, such as lost productivity and fraud, are borne largely by the public and by Internet service providers, which have been forced to add extra capacity to cope with the deluge. Of course, the Internet service providers simply pass the cost of the extra capacity along to the end users. Spamming is widely reviled, and has been the subject of legislation in many jurisdictions.

Currently, some "solutions" to the spam problem are being attempted. For instance, one such "solution" is image verification, also referred to as "Captcha". Captcha is a type of challenge-response test used to ensure that a response, an e-mail, or a web-form is not computing system generated. Current Captcha systems typically involve a first computing system, such as a server computing system, asking a user to complete a simple test which the first computing system is able to generate and then analyze/grade.

Using currently available Captcha techniques, the generated test typically involves displaying multiple symbols, such as letters and/or numbers. Typically the multiple symbols of the generated Captcha test are displayed in a distorted manner such as distorted text images, and/or in abnormal groupings or with abnormal spacing, and/or angled, and/or crossed by an angled line. In addition, the multiple symbols of the generated Captcha test are often displayed as both capital and lowercases symbols.

Using currently available Captcha techniques the user is then asked to key the distorted multiple symbols of the generated Captcha test into a response data entry field on a display screen. In theory, a computing system, as opposed to a human being, is unable to recognize the distorted multiple symbols of the generated Captcha test. As a result, under the currently available Captcha theory, any user entering a correct solution, i.e., entering the correct sequence and format of the multiple symbols of the generated Captcha test into the data entry field is presumed to be a human being, and not a computing system or other automated device. Thus, currently available Captcha techniques are sometimes described as a reverse Turing test, because they are administered by a machine and targeted to a human, in contrast to the standard Turing test that is typically administered by a human and targeted to a machine.

It is worth noting that in many cases, legitimate human users are also unable to recognize the distorted multiple symbols of the generated Captcha test and it is not uncommon for legitimate users to have to enter a response multiple times. Obviously, this represents a significant burden on legitimate users and the problem will only get worse as display screens and user interface devices continue to get physically smaller and smaller.

Captcha systems have historically proven to be reasonably effective. However, more recently, Spammers have developed software scripts and programs that can copy the exact Captcha images and then extract the correct response. Consequently, Captcha has become less effective as a Spam barrier in recent times. Part of the reason Captcha has become vulnerable to Spammer developed software scripts and programs is the static nature of the Captcha images and the fact that they are currently images of letters and/or numbers, i.e., symbols, that can be captured and mapped to symbol identification databases. In short, the Captcha images require no cognitive/human analysis beyond recognizing a set of static symbols.

As a result of the situation described above, spamming remains economically viable even in the presence of currently available Captcha systems. Consequently, the costs of spam, such as lost productivity and fraud, are still borne largely by the public and by Internet service providers.

SUMMARY

In accordance with one embodiment, a method and system for providing a dynamic image verification system to confirm human input includes a process for providing a dynamic image verification system to confirm human input whereby, in one embodiment, a dynamic verification image that is pictorial in nature, and/or is animated, is displayed as part of a generated image verification test. The user is then asked to describe the pictorial image and/or the animation shown by the dynamic verification image and/or, in one embodiment, respond to the dynamic verification image in a manner appropriate to the dynamic verification image. In one embodiment, any user entering a correct solution, i.e., describing the pictorial image and/or animated action of the dynamic verification image correctly, or, in one embodiment, interacting with the dynamic verification image in an appropriate manner, is presumed to be a human being, and not a computing system or other automated device.

In one embodiment, the dynamic verification image is a pictorial image and the user is asked to describe the dynamic verification image. The dynamic verification image chosen can be any dynamic verification image desired that is subject to human description.

In one embodiment, the dynamic verification image is an animated dynamic verification image showing a given image in some form of action, such as, but not limited to: a moving animal, such as a running horse, a swimming fish, a charging bull, or a flying bird; a moving object, such as a rotating globe, a flying airplane, a car driving down a road; a human activity, such as a swimming man, a dancing woman, a crawling baby, or a child riding a bike; or any other animated dynamic verification image that depicts an entity and/or object doing something that is a readily recognized action and that can be readily described. In these embodiments, the user is later asked to describe the dynamic verification image and/or the action taking place in the dynamic verification image.

In one embodiment, the dynamic verification image is actually multiple images of different items, such as, but not limited to: a set of different animals; a set of different fruits; a set of different colored balls; or any other set of images that can be readily identified and are distinguishable from each other. In these embodiments, the user is later asked to select a specific image from the displayed set of images.

In one embodiment, the dynamic verification image is one or more images that require an appropriate user action. For instance, in one embodiment, the dynamic verification image is a light switch and the user is directed to activate the light switch using a user interface device. As another example, in one embodiment, the dynamic verification image is a doorbell and the user is asked to ring the doorbell using a user interface device. As another example, in one embodiment, the dynamic verification image is a lock and a key and the user is asked to put the key in the lock using a user interface device. As another example, in one embodiment, the dynamic verification image is musical instrument, such as a guitar, and the user is asked to make a motion of playing the instrument using a user interface device. In other embodiments, the dynamic verification image is any image, or images, that lend themselves to a response, typically made using a user interface device, that is appropriate to the image, or a specific part of the image.

In one example, a list of "correct" responses for a given dynamic verification image is attached to, and/or otherwise associated with, the given dynamic verification image. In one embodiment, a level of match accuracy between a user's response and the exact "correct" responses for a given dynamic verification image is established. In one embodiment, a level of match accuracy between a user's response and the exact "correct" responses for a given dynamic verification image is established and is editable by the provider of the process for providing a dynamic image verification system to confirm human input.

In one embodiment, one or more dynamic verification images, and in some cases, one or more types of dynamic verification images, are generated and a pool of the one or more dynamic verification images is maintained along with the list of correct responses for each dynamic verification image in the pool of one or more dynamic verification images. In these instances, when a dynamic verification image is desired, a given dynamic verification image is selected at random from the pool. In this way, no single response, or small set of responses, to the dynamic verification images can be ascertained and used by a computing system to implement an automated response.

In one embodiment, new dynamic verification images are also added to the pool as needed and/or desired. In one embodiment, dynamic verification images are also removed from the pool as needed and/or desired.

In one embodiment, data representing the one or more dynamic verification images and/or data representing the list of correct responses for each dynamic verification image is stored in one or more memory systems, databases, cache memories, and/or any main memory or mass memory, associated with a provider computing system, in any computing system and/or server system, or other device, in another location, or on/in a computer readable medium, and/or any other computer program product, as defined herein. In one embodiment, data representing the one or more dynamic verification images and/or data representing the list of correct responses for each dynamic verification image, is stored in whole, or in part, on a webpage, in a web-based system, or on a public network such as the Internet.

In one embodiment, a user attempts to submit data and/or transmit communication data via any user computing system and/or server system, such as, but not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the user computing system, can be, but is not limited to, computing systems made up of multiple: computers; wireless devices; cellular telephones; digital telephones; two-way pagers; PDAs; media players; server computers; or any desired combination of these devices.

In one embodiment, the user attempts to submit data and/or transmit data via any user computing system and/or server system using any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems.

In one embodiment, in response to the user's attempt to submit data and/or transmit data via any user computing system and/or server system, a given one of the one or more dynamic verification images is randomly selected and sent as data to the user via any provider computing system and/or server system, as discussed herein, and/or as known in the art at the time of filing, and/or as developed after the time of filing. In one embodiment, a given one of the one or more dynamic verification images is randomly selected and sent as data to the user via any provider computing system and/or server system, as discussed herein, and/or as known in the art at the time of filing, and/or as developed after the time of filing, using any network as discussed herein, and/or as known in the art at the time of filing, and/or as developed after the time of filing.

In one embodiment, the given dynamic verification image is displayed to the user, along with any instructions, on a display device associated with any user computing system as discussed herein, and/or as known in the art at the time of filing, and/or as developed after the time of filing. As a specific example, in one embodiment, a dynamic verification image is displayed to the user via a GAF animation or motion picture shown on any user computing system as discussed herein, and/or as known in the art at the time of filing, and/or as developed after the time of filing.

In one embodiment, the user is then asked to submit a response that describes the pictorial image and/or the animation shown by the given dynamic verification image and/or, in one embodiment, to respond to the given dynamic verification image in a manner appropriate to the given dynamic verification image, using a user interface device, such as, but not limited to: a keyboard, a mouse, a touchpad, voice recognition software, or any other device and/or system capable of providing user input to a computing system and/or for translating user actions into computing system operations, whether available or known at the time of filing or as developed later.

As a specific example, in one embodiment, the user is shown a dynamic verification image that is a red ball bouncing. In one embodiment, the user is then asked to indicate what they are viewing.

In one embodiment, data representing the user's submitted response that describes the pictorial image and/or the animation shown by the given dynamic verification image and/or, in one embodiment, the user's response to the given dynamic verification image that is appropriate to the given dynamic verification image, is obtained by any provider computing system and/or server system, as discussed herein, and/or as known in the art at the time of filing, and/or as developed after the time of filing. In one embodiment, data representing the user's submitted response that describes the pictorial image and/or the animation shown by the given dynamic verification image and/or, in one embodiment, the user's response to the given dynamic verification image that is appropriate to the given dynamic verification image, is obtained by any provider computing system and/or server system, as discussed herein, and/or as known in the art at the time of filing, and/or as developed after the time of filing, using any network as discussed herein, and/or as known in the art at the time of filing, and/or as developed after the time of filing.

In one embodiment, the data representing the user's submitted response that describes the pictorial image and/or the animation shown by the given dynamic verification image and/or, in one embodiment, the user's response to the given dynamic verification image that is appropriate to the given dynamic verification image, and the data representing the list of correct responses for the given dynamic verification image is analyzed and/or compared to determine the correctness of the user's response.

As noted above, in one embodiment, a level of match accuracy between the data representing the user's submitted response that describes the pictorial image and/or the animation shown by the given dynamic verification image and/or, in one embodiment, the user's response to the given dynamic verification image that is appropriate to the given dynamic verification image, and the data representing the list of correct responses for the given dynamic verification image is established. In one embodiment, a level of match accuracy between the data representing the user's submitted response that describes the pictorial image and/or the animation shown by the given dynamic verification image and/or, in one embodiment, the user's response to the given dynamic verification image that is appropriate to the given dynamic verification image, and the data representing the list of correct responses for the given dynamic verification image is established and is editable by the provider of the process for providing a dynamic image verification system to confirm human input.

In one embodiment, a determination is then made as to whether or not to allow the user to submit data and/or transmit the communication data via any user computing system and/or server system based, at least in part on the level of match accuracy between the data representing the user's submitted response that describes the pictorial image and/or the animation shown by the given dynamic verification image and/or, in one embodiment, the user's response to the given dynamic verification image that is appropriate to the given dynamic verification image, and the data representing the list of correct responses for the given dynamic verification image.

Using the method and system for providing a dynamic image verification system to confirm human input discussed herein, the dynamic verification image utilized does not rely on static symbols that can be captured and mapped to symbol identification databases by computing systems to generate automated responses. Consequently, using the method and system for providing a dynamic image verification system to confirm human input discussed herein, the dynamic verification image identification relies on human cognitive functions that cannot currently be mimicked by computing systems, programs, machines, or any currently available software. In addition, using the method and system for providing a dynamic image verification system to confirm human input discussed herein, the dynamic verification image is not language or alpha-numeric dependent, i.e., images and animations are universal and language independent. Consequently, the method and system for providing a dynamic image verification system to confirm human input discussed herein is more effective at preventing spam than currently available systems that rely on static symbols.

As discussed in more detail below, using the below embodiments, with little or no modification and/or user input, there is considerable flexibility, adaptability, and opportunity for customization to meet the specific needs of various users under numerous circumstances.

Figure 1:
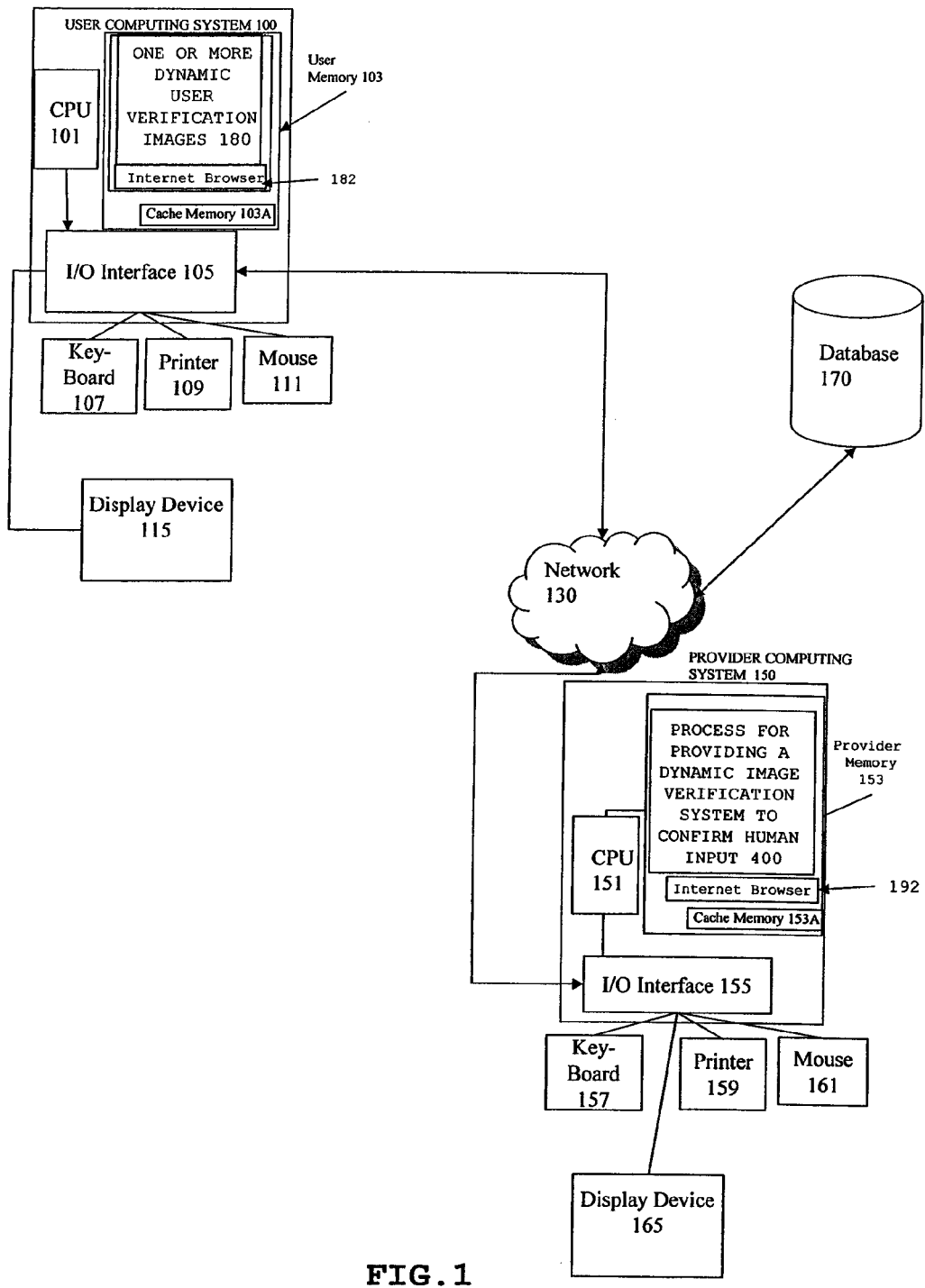
FIG. 1 is a block diagram of an exemplary hardware architecture for implementing one embodiment including a user computing system, a provider computing system, a database, and a network.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for providing a dynamic image verification system to confirm human input includes a process for providing a dynamic image verification system to confirm human input whereby, in one embodiment, a dynamic verification image that is pictorial in nature, and/or is animated, is displayed as part of a generated image verification test. The user is then asked to describe the pictorial image and/or the animation shown by the dynamic verification image and/or, in one embodiment, respond to the dynamic verification image in a manner appropriate to the dynamic verification image. In one embodiment, any user entering a correct solution, i.e., describing the pictorial image and/or animated action of the dynamic verification image correctly, or, in one embodiment, interacting with the dynamic verification image in an appropriate manner, is presumed to be a human being, and not a computing system or other automated device.

FIG. 1 is a block diagram of an exemplary hardware architecture for implementing one embodiment of a system and method for providing a dynamic image verification system to confirm human input, such as exemplary process 400 (FIG. 4) discussed herein, that, returning to FIG. 1, includes: a user computing system 100, e.g., a first computing system; a provider computing system 150, e.g., a second computing system; and a database 170, all operatively coupled by a network 130.

As seen in FIG. 1, user computing system 100 typically includes one or more central processing units, CPU(s) 101, an input/output (I/O) interface 105, and a user memory 103, including cache user memory 103A. As discussed in more detail below, in one embodiment, user memory 103 includes all, or part, of instructions and data associated with a process for providing a dynamic image verification system to confirm human input 400 (see FIG. 4), and, in particular, one or more dynamic verification images 180.

Returning to FIG. 1, user computing system 100 may further include standard user interface devices such as a keyboard 107, a mouse 111, a printer 109, and a display device 115, as well as, one or more standard input/output (I/O) devices (not shown), such as a compact disk (CD) or Digital Video Disc (DVD) drive, floppy disk drive, or other digital or waveform port, or other device capable of inputting data to, and outputting data from, user computing system 100, whether available or known at the time of filing or as later developed.

In one embodiment, user computing system 100 also includes an Internet browser capability 182 that, in one embodiment, includes a search engine (not shown) and is stored, in whole, or in part, in user memory 103. In one embodiment, at least part of process for providing a dynamic image verification system to confirm human input 400 (see FIG. 4) is provided through, and/or associated with, Internet browser capability 182.

In one embodiment, user computing system 100 is a computing system accessible by one or more users. In one embodiment, user computing system 100 is used, and/or accessible, by another computing system, such as provider computing system 150 (discussed below).

In one embodiment, user computing system 100 is representative of multiple user computing systems. In one embodiment, user computing system 100 is representative of a webpage, or web-based system. In one embodiment, user computing system 100 is a server computing system. In various embodiments, user computing system 100 is any computing system as defined herein and/or as known in the art at the time of filing and/or as developed thereafter, that includes components that can execute all, or part, of a process for providing a dynamic image verification system to confirm human input in accordance with at least one of the embodiments as described herein.

As also seen in FIG. 1, provider computing system 150 typically includes one or more central processing units, CPU(s) 151, an input/output (I/O) interface 155, and a provider memory 153, including cache memory 153A. As discussed in more detail below, in one embodiment, provider memory 153 includes all, or part, of instructions and data associated with a process for providing a dynamic image verification system to confirm human input 400.

Returning to FIG. 1, provider computing system 150 may further include standard user interface devices such as a keyboard 157, a mouse 161, a printer 159, and a display device 165, as well as, one or more standard input/output (I/O) devices (not shown), such as a compact disk (CD) or Digital Video Disc (DVD) drive, floppy disk drive, or other digital or waveform port, or other device capable of inputting data to, and outputting data from, provider computing system 150, whether available or known at the time of filing or as later developed.

In one embodiment, provider computing system 150 also includes an Internet browser capability 192 that, in one embodiment, includes a search engine (not shown) and is stored, in whole, or in part, in provider memory 153.

In one embodiment, provider computing system 150 is used, and/or accessible, by another computing system, such as user computing system 100.

In one embodiment, provider computing system 150 is representative of multiple provider computing systems. In one embodiment, provider computing system 150 is representative of a webpage, or web-based system. In one embodiment, provider computing system 150 is a server computing system. In one embodiment, provider computing system 150 is a web-server computing system. In various embodiments, provider computing system 150 is any computing system as defined herein and/or as known in the art at the time of filing and/or as developed thereafter, that includes components that can execute all, or part, of a process for providing a dynamic image verification system to confirm human input in accordance with at least one of the embodiments as described herein.

Also shown in FIG. 1 is database 170. In one embodiment, database 170 is a data storage device, a designated server system or computing system, or a designated portion of one or more server systems or computing systems, such as computing systems 100 and/or 150, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a process for providing a dynamic image verification system to confirm human input.

In one embodiment, data associated with a process for providing a dynamic image verification system to confirm human input, and/or data associated with one of more dynamic verification images, is stored, in whole, or in part, in database 170, and is used by, or is accessed by, a process for providing a dynamic image verification system to confirm human input. In one embodiment, database 170 is accessible by one or more users. In one embodiment, database 170 is used, and/or accessible, by a computing system, such as computing systems 100 and/or 150.

In one embodiment, computing systems 100 and 150, and database 170, are communicably coupled through network 130. Network 130 can be any network or network system as defined herein, and/or known in the art at the time of filing, and/or as developed after the time of filing, capable of allowing communication between two or more computing systems, server systems, and/or databases.

In one embodiment, computing systems 100 and 150, database 170, and network 130 are part of a cloud computing environment.

Those of skill in the art will readily recognize that the components shown in FIG. 1, such as computing systems 100 and 150, database 170, and their respective components, are shown for illustrative purposes only and that architectures with more or fewer components can implement, and benefit from, one or more embodiments. Moreover, one or more components of user computing system 100, provider computing system 150, and database 170, may be located remotely from their respective system and accessed via network 130. In addition, the particular type of, and configuration of, computing systems 100 and 150 are not relevant.

Figure 4:
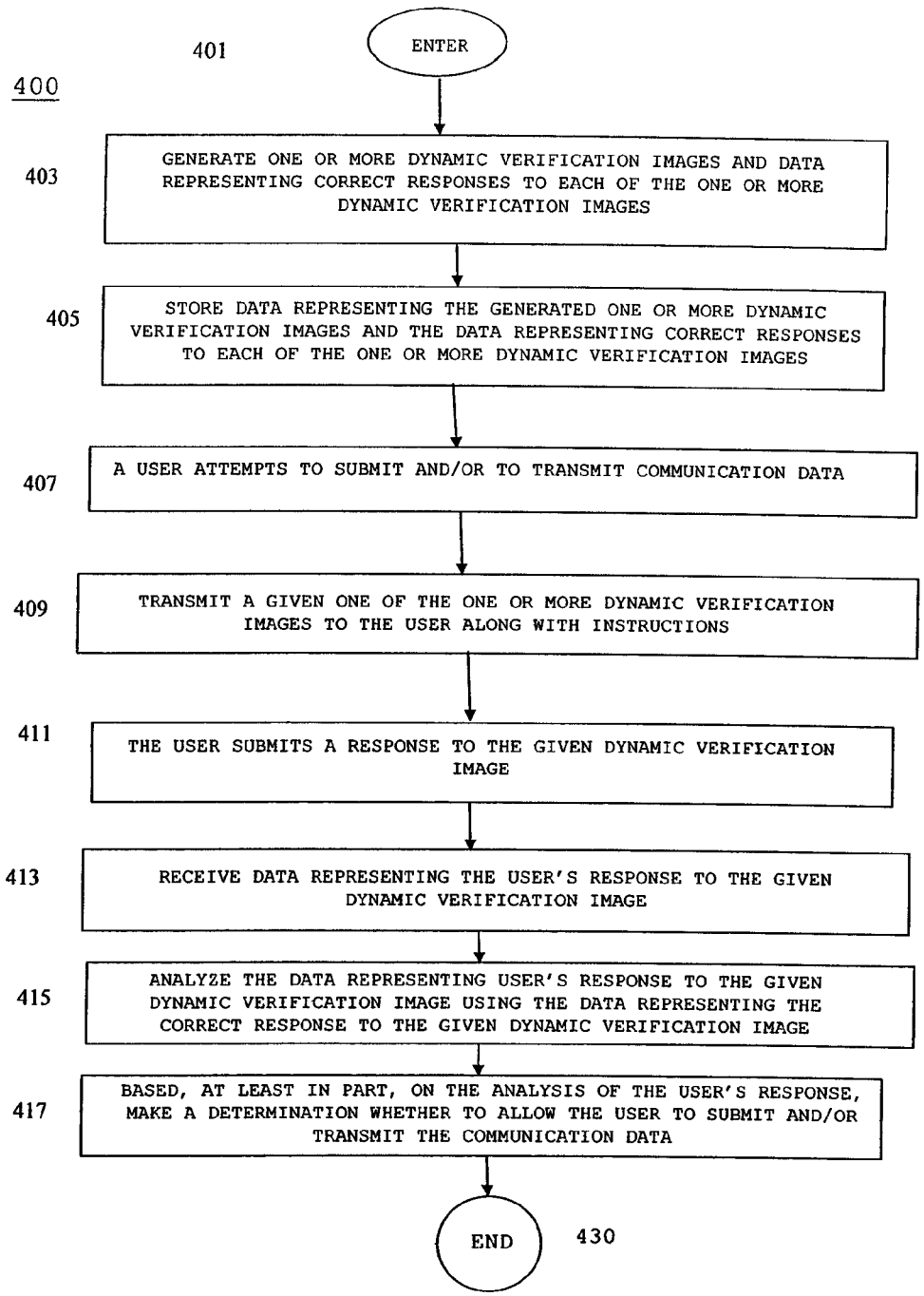
FIG. 4 is an exemplary flow chart illustrating one embodiment of a process for providing a dynamic image verification system to confirm human input.

As discussed above, in one embodiment, at least part of user memory 103 includes all, or part, of instructions and data associated with a process for providing a dynamic image verification system to confirm human input 400 (see FIG. 4).

Figure 2:
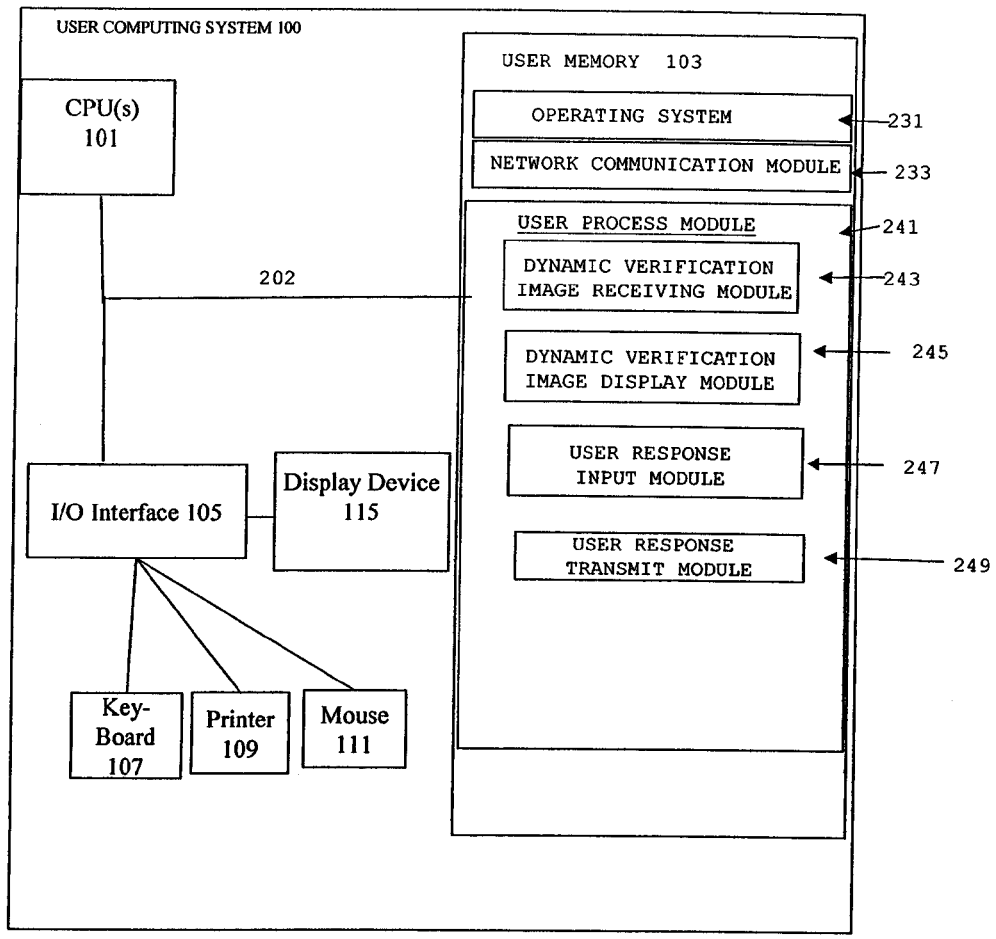
FIG. 2 is a block diagram showing more detail of an exemplary user computing system in accordance with one embodiment.

FIG. 2 is a more detailed block diagram of an exemplary user computing system 100 (FIG. 1). As seen in FIG. 2, in one embodiment, user computing system 100 includes one of more Central Processing Unit(s), CPU(s) 101; user memory 103; an Input/Output interface, I/O interface 105, including one or more user interface devices such as display device 115, keyboard 107, printer 109, and/or mouse 111; all interconnected by one or more communication buses 202.

As also seen in FIG. 2, in one embodiment, user memory 103 can store data and/or instructions associated with, but not limited to, the following elements, subsets of elements, and/or super sets of elements for processing by one or more processors, such as CPU(s) 101 (FIG. 2) and/or 151 (FIG. 3): operating system 231 that includes procedures, data, and/or instructions for handling various services and performing/coordinating hardware dependent tasks; network communications module 233 that includes procedures, data, and/or instructions, for connecting user computing system 100 to other computing systems, such as another user computing system 100 and/or provider computing system 150 of FIG. 1, and/or a network, such as network 130 of FIG. 1, and/or a database, such as database 170 of FIG. 1; and user process module 241 (FIG. 2) that includes procedures, data, and/or instructions, for implementing at least part of a process for providing a dynamic image verification system to confirm human input 400 (FIG. 4).

As also seen in FIG. 2, in one embodiment, user process module 241 of user memory 103 includes: dynamic verification image receiving module 243 that includes procedures, data, and/or instructions for receiving one or more dynamic verification images and instructions from a provider computing system; dynamic verification image display module 245 (FIG. 2) that includes procedures, data, and/or instructions for displaying one or more dynamic verification images on display device 115 of user computing system 100; user response input module 247 that includes procedures, data, and/or instructions, for inputting a user response that describes the pictorial image and/or the animation shown by the given dynamic verification image and/or, in one embodiment, the user's response to the given dynamic verification image that is appropriate to the given dynamic verification image; and user response transmit module 249 that includes procedures, data, and/or instructions for transmitting data representing the user response that describes the pictorial image and/or the animation shown by the given dynamic verification image and/or, in one embodiment, the user's response to the given dynamic verification image that is appropriate to the given dynamic verification image, to a provider computing system.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 and discussed herein do not limit the scope as claimed below.

A more detailed discussion of the operation of exemplary user computing system 100, user memory 103, and user process module 241 of user memory 103, is provided below with respect to FIG. 4.

Figure 3:
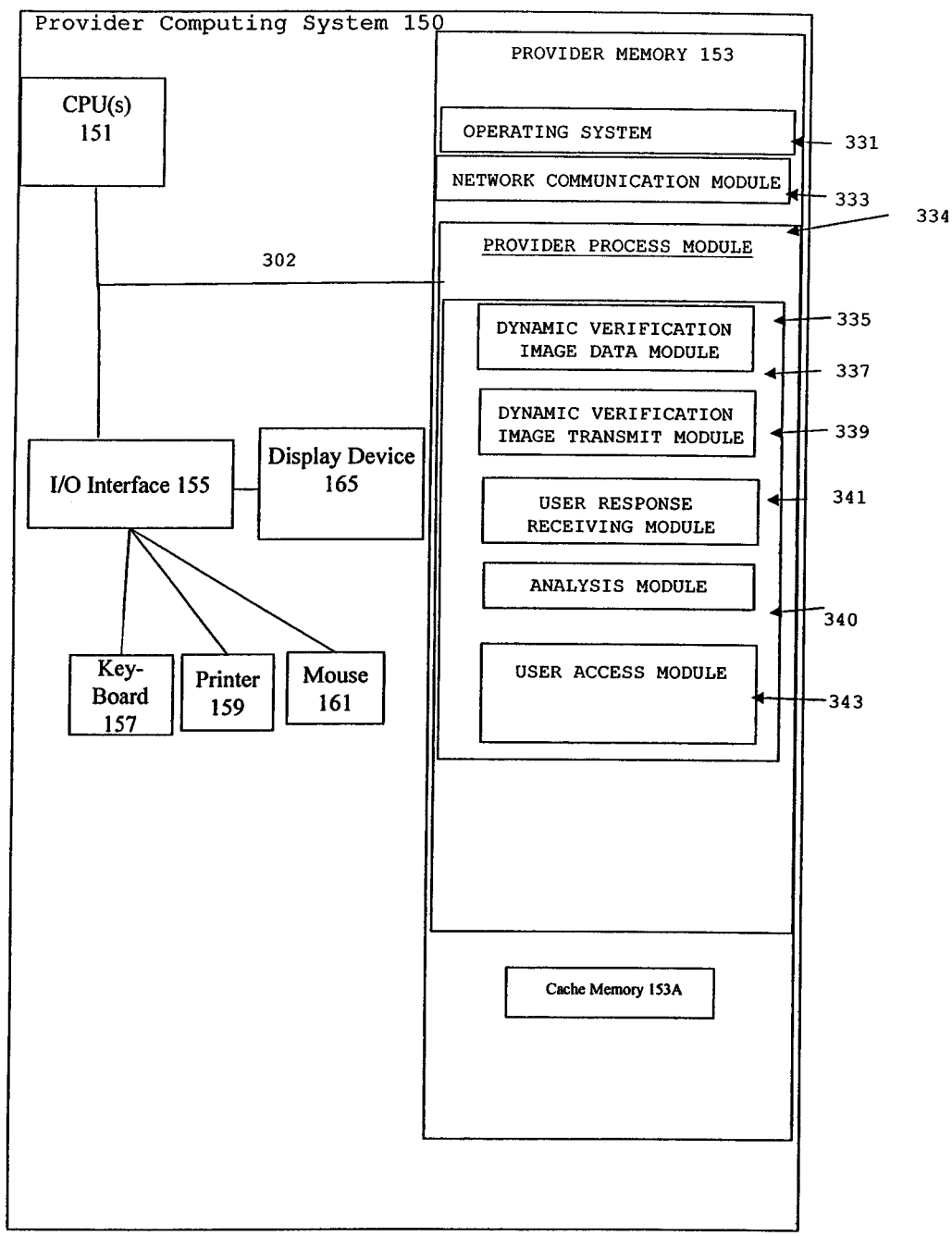
FIG. 3 is a block diagram showing more detail of an exemplary provider computing system in accordance with one embodiment.

FIG. 3 is a more detailed block diagram of an exemplary provider computing system 150. As seen in FIG. 3, in one embodiment, provider computing system 150 includes one of more Central Processing Unit(s), CPU(s) 151; provider memory 153; an Input/Output interface, I/O interface 155, including one or more user interface devices such as display device 165, keyboard 157, printer 159, and/or mouse 161; all interconnected by one or more communication buses 302.

As also seen in FIG. 3, in one embodiment, provider memory 153 can store data and/or instructions associated with, but not limited to, the following elements, subsets of elements, and/or super sets of elements for use in processing by one or more processors, such as CPU(s) 101 (FIG. 2) and/or 151 (FIG. 3): operating system 331 that includes procedures, data, and/or instructions for handling various services and performing/coordinating hardware dependent tasks; network communications module 333 that includes procedures, data, and/or instructions, for connecting provider computing system 150 to other computing systems, such as user computing system 100 and/or a network, such as network 130 of FIG. 1, and/or a database, such as database 170 of FIG. 1; provider process module 334 (FIG. 3) that includes procedures, data, and/or instructions, for implementing at least part of a process for providing a dynamic image verification system to confirm human input 400 (FIG. 4).

As also seen in FIG. 3, in one embodiment, provider process module 334 of provider memory 153 includes: dynamic verification image data module 335 that includes procedures, data, and/or instructions associated with one or more dynamic verification images, and in some cases, one or more types of dynamic verification images, and the list of correct responses for each dynamic verification image in the pool of one or more dynamic verification images; dynamic verification image transmit module 339 (FIG. 3) that includes procedures, data, and/or instructions for transmitting one or more dynamic verification images and instructions to dynamic verification image receiving module 243 (FIG. 2); user response receiving module 341 (FIG. 3) that includes procedures, data, and/or instructions, for receiving data representing the user response that describes the pictorial image and/or the animation shown by the given dynamic verification image and/or, in one embodiment, the user's response to the given dynamic verification image that is appropriate to the given dynamic verification image, from user response transmit module 249 (FIG. 2); analysis module 340 that includes procedures, data, and/or instructions for analyzing/comparing the data representing the user's submitted response that describes the pictorial image and/or the animation shown by a given dynamic verification image and/or, in one embodiment, the user's response to the given dynamic verification image that is appropriate to the given dynamic verification image, and the data representing the list of correct responses for the given dynamic verification image; and user permission module 343 that includes procedures, data, and/or instructions associated with a determination as to whether or not to allow the user to submit data and/or transmit the communication data via any user computing system and/or server system based, at least in part on the level of match accuracy between the data representing the user's submitted response that describes the pictorial image and/or the animation shown by the given dynamic verification image and/or, in one embodiment, the user's response to the given dynamic verification image that is appropriate to the given dynamic verification image, and the data representing the list of correct responses for the given dynamic verification image.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 and discussed herein do not limit the scope as claimed below.

A more detailed discussion of the operation of exemplary provider computing system 150, provider memory 153, and provider process module 334 of provider memory 153, is provided below with respect to FIG. 4.

Process

Herein, the terms "user", includes, but is not limited to any person, party, business, system, application, organization, and/or entity desiring to submit and/or transmit data and/or that is provided one or more dynamic verification images by process for providing a dynamic image verification system to confirm human contact.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a method and system for providing a dynamic image verification system to confirm human input includes a process for providing a dynamic image verification system to confirm human input whereby, in one embodiment, a dynamic verification image that is pictorial in nature, and/or is animated, is displayed as part of a generated image verification test. The user is then asked to describe the pictorial image and/or the animation shown by the dynamic verification image and/or, in one embodiment, respond to the dynamic verification image in a manner appropriate to the dynamic verification image. In one embodiment, any user entering a correct solution, i.e., describing the pictorial image and/or animated action of the dynamic verification image correctly, or, in one embodiment, interacting with the dynamic verification image in an appropriate manner, is presumed to be a human being, and not a computing system or other automated device.

FIG. 4 a flow chart depicting a process for providing a dynamic image verification system to confirm human input 400 in accordance with one embodiment. Process for providing a dynamic image verification system to confirm human input 400 begins at ENTER OPERATION 401 of FIG. 4 and process flow proceeds to GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403.

In one embodiment, at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403, at least one dynamic verification image that is pictorial in nature, and/or is animated, is generated as part of a generated image verification test.

In one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is a pictorial image and, as discussed below, the user is eventually asked to describe the dynamic verification image. The dynamic verification image chosen can be any dynamic verification image desired that is subject to human description. However, in one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is pictorial and not symbolic in nature. That is to say, the dynamic verification image is illustrative and conveys information by likeness to an entity or object and not by letters or numbers representing an object that are subject to being "read".

In one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is an animated dynamic verification image showing a given image in some form of action, such as, but not limited to: a moving animal, such as a running horse, a swimming fish, a charging bull, or a flying bird; a moving object, such as a rotating globe, a flying airplane, a car driving down a road; a human activity, such as a swimming man, a dancing woman, a crawling baby, or a child riding a bike; or any other animated dynamic verification image that depicts an entity and/or object doing something that is a readily recognized action and that can be readily described by a human being/user. As discussed below, in these embodiments, the user is eventually asked to describe the dynamic verification image and/or the action taking place in the dynamic verification image.

In one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is made up of two or more sub-images of different items, such as, but not limited to: a set of two or more different animals; a set of two or more different fruits; a set of two or more different colored balls; or any other set of two or more sub-images that can be readily identified and are distinguishable from each other. As discussed below, in these embodiments, the user is eventually asked to select a specific image from the displayed set of images.

In one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is one or more images that require, or are susceptible to, an appropriate user action specific to the given dynamic verification image. For instance, in one embodiment, the dynamic verification image is a light switch and the user is directed to activate the light switch using a user interface device such as, but not limited to: a keyboard; such as keyboard 107 of FIG. 2; a mouse, such as mouse 111 of FIG. 2; a touchpad; voice recognition software; or any other device and/or system capable of providing user input to a computing system and/or for translating user actions into computing system operations, whether available or known at the time of filing or as developed later.

Returning to FIG. 4, as another example, in one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is a doorbell and the user is asked to ring the doorbell using a user interface device such as, but not limited to: a keyboard; such as keyboard 107 of FIG. 2; a mouse, such as mouse 111 of FIG. 2; a touchpad; voice recognition software; or any other device and/or system capable of providing user input to a computing system and/or for translating user actions into computing system operations, whether available or known at the time of filing or as developed later.

Returning to FIG. 4, as another example, in one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is an image of a lock and an image of a key and the user is asked to position the image of the key in the image of the lock using a user interface device such as, but not limited to: a keyboard; such as keyboard 107 of FIG. 2; a mouse, such as mouse 111 of FIG. 2; a touchpad; voice recognition software; or any other device and/or system capable of providing user input to a computing system and/or for translating user actions into computing system operations, whether available or known at the time of filing or as developed later.

Returning to FIG. 4, as another example, in one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is musical instrument, such as a guitar, and the user is asked to make a motion of playing the instrument using a user interface device such as, but not limited to: a keyboard; such as keyboard 107 of FIG. 2; a mouse, such as mouse 111 of FIG. 2; a touchpad; voice recognition software; or any other device and/or system capable of providing user input to a computing system and/or for translating user actions into computing system operations, whether available or known at the time of filing or as developed later.

Returning to FIG. 4, in other embodiments, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is any image, or images, that lend themselves to a response, typically made using a user interface device, that is appropriate to the image, or a specific part of the image.

In one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is any dynamic verification image that is primarily pictorial and not primarily symbolic in nature. That is to say, the dynamic verification image is primarily illustrative and conveys information by likeness to an entity or object and not by letters or numbers representing an object.

In one embodiment, at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 a list of "correct" responses for a given dynamic verification image is attached to, and/or otherwise associated with, the given dynamic verification image.

In one embodiment, at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 a level of match accuracy between a user's response and the exact correct responses for a given dynamic verification image is established.

In one embodiment, at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 a level of match accuracy between a user's response and the exact correct responses for a given dynamic verification image is established and is made editable by the provider of process for providing a dynamic image verification system to confirm human input 400.

In one embodiment, at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 one or more dynamic verification images, and in some cases, one or more of the types of dynamic verification images discussed above, are generated and a pool of the one or more dynamic verification images is maintained along with the list of correct responses for each dynamic verification image in the pool of one or more dynamic verification images. In these instances, when a dynamic verification image is desired, a given dynamic verification image is selected at random, or by some other defined process, from the pool. In this way, no single response, or small set of responses, to the dynamic verification images can be ascertained and used by a computing system to implement an automated response.

In one embodiment, at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403, new dynamic verification images are also added to the pool as needed and/or desired. In one embodiment, at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403, dynamic verification images are also removed from the pool as needed and/or desired.

In one embodiment, once at least one dynamic verification image that is pictorial in nature, and/or is animated, is generated as part of a generated image verification test at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403, process flow proceeds to STORE DATA REPRESENTING THE GENERATED ONE OR MORE DYNAMIC VERIFICATION IMAGES AND THE DATA REPRESENTING CORRECT RESPONSES TO EACH OF THE ONE OR MORE DYNAMIC VERIFICATION IMAGES OPERATION 405.

In one embodiment, at STORE DATA REPRESENTING THE GENERATED ONE OR MORE DYNAMIC VERIFICATION IMAGES AND THE DATA REPRESENTING CORRECT RESPONSES TO EACH OF THE ONE OR MORE DYNAMIC VERIFICATION IMAGES OPERATION 405 data representing the one or more dynamic verification images and/or data representing the list of correct responses for each dynamic verification image of GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is stored in one or more memory systems, databases, cache memories, and/or any main memory or mass memory, associated with a provider computing system, and/or in any computing system and/or server system, or other device, in another location, or on/in a computer readable medium, and/or any other computer program product, as defined herein. In one embodiment, data representing the one or more dynamic verification images and/or data representing the list of correct responses for each dynamic verification image, is stored in whole, or in part, on a webpage, in a web-based system, or on a public network such as the Internet.

For instance, in one embodiment, at STORE DATA REPRESENTING THE GENERATED ONE OR MORE DYNAMIC VERIFICATION IMAGES AND THE DATA REPRESENTING CORRECT RESPONSES TO EACH OF THE ONE OR MORE DYNAMIC VERIFICATION IMAGES OPERATION 405 data representing the one or more dynamic verification images and/or data representing the list of correct responses for each dynamic verification image of GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403, is stored in whole, or in part, in a data storage means maintained by, accessible by, owned by, or otherwise related to: process for providing a dynamic image verification system to confirm human input 400 (FIG. 4), and/or a provider of process for providing a dynamic image verification system to confirm human input 400; or any other party, by any one of the numerous mechanisms known to those of skill in the art.

In one embodiment, the data, in whole, or in part, is stored in a memory system, such as provider memory system 153 of provider computing system 150 (FIG. 1 and/or FIG. 3), dynamic verification image data module, such as dynamic verification image data module 335 of provider process module 334 of provider memory 153 of provider computing system 150 (FIG. 3).

Returning to FIG. 4, in other embodiments, at STORE DATA REPRESENTING THE GENERATED ONE OR MORE DYNAMIC VERIFICATION IMAGES AND THE DATA REPRESENTING CORRECT RESPONSES TO EACH OF THE ONE OR MORE DYNAMIC VERIFICATION IMAGES OPERATION 405 data representing the one or more dynamic verification images and/or data representing the list of correct responses for each dynamic verification image of GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is stored in whole, or in part, in any computing system memory, or server memory system memory, or database, such as database 170, of FIG. 1, or in a cache memory, such as cache memory 153A of FIG. 1 and FIG. 3, or in any main memory or mass memory, associated with a computing system, such as computing systems 100 or 150 described above. In one embodiment, the data, in whole, or in part, is stored in any computing system and/or server system, or other device, in another location, or on/in a computer readable medium, and/or any other computer program product. In one embodiment, the data, in whole, or in part, is stored on a webpage, in a web-based system, or on a public network such as the Internet.

In one embodiment, once data representing the one or more dynamic verification images and/or data representing the list of correct responses for each dynamic verification image of GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is stored in one or more memory systems, databases, cache memories, and/or any main memory or mass memory, associated with a provider computing system, in any computing system and/or server system, or other device, in another location, or on/in a computer readable medium, and/or any other computer program product, as defined herein, at STORE DATA REPRESENTING THE GENERATED ONE OR MORE DYNAMIC VERIFICATION IMAGES AND THE DATA REPRESENTING CORRECT RESPONSES TO EACH OF THE ONE OR MORE DYNAMIC VERIFICATION IMAGES OPERATION 405, process flow proceeds to A USER ATTEMPTS TO SUBMIT AND/OR TO TRANSMIT COMMUNICATION DATA OPERATION 407.

In one embodiment, at A USER ATTEMPTS TO SUBMIT AND/OR TO TRANSMIT COMMUNICATION DATA OPERATION 407 a user attempts to submit data and/or transmit communication data via any user computing system and/or server system, as discussed herein, and/or known in the art at the time of filing, and/or as developed after the time of filing, and/or using any network or network system as discussed herein, and/or known in the art at the time of filing, and/or as developed after the time of filing.

For instance, in one embodiment, at A USER ATTEMPTS TO SUBMIT AND/OR TO TRANSMIT COMMUNICATION DATA OPERATION 407 a user attempts to submit data and/or transmit communication data through a user computing system, such user computing system 100 of FIGS. 1 and 2. In one embodiment, at A USER ATTEMPTS TO SUBMIT AND/OR TO TRANSMIT COMMUNICATION DATA OPERATION 407 a user attempts to submit data and/or transmit communication data through and/or to a web-page and/or web-site.

In one embodiment, at A USER ATTEMPTS TO SUBMIT AND/OR TO TRANSMIT COMMUNICATION DATA OPERATION 407 a user attempts to submit data and/or transmit communication data through and/or to a provider computing system, such as provider computing system 150 of FIGS. 1 and 3.

In one embodiment, at A USER ATTEMPTS TO SUBMIT AND/OR TO TRANSMIT COMMUNICATION DATA OPERATION 407 a user attempts to submit data and/or transmit communication data through a user interface screen of a display device that is associated with a computing system, such as user computing system 100 and display device 115 of user computing system 100 of FIG. 2, that is any computing system and/or server system, such as, but not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices.

In one embodiment, at A USER ATTEMPTS TO SUBMIT AND/OR TO TRANSMIT COMMUNICATION DATA OPERATION 407 a user attempts to submit data and/or transmit communication data via any network or network system such as, but not limited to, network 130 of FIG. 1, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems.

In one embodiment, at A USER ATTEMPTS TO SUBMIT AND/OR TO TRANSMIT COMMUNICATION DATA OPERATION 407 a user attempts to submit data and/or transmit communication data by attempting to fill-in and submit a web-based form. In one embodiment, at A USER ATTEMPTS TO SUBMIT AND/OR TO TRANSMIT COMMUNICATION DATA OPERATION 407 a user attempts to submit data and/or transmit communication data by e-mail. In one embodiment, at A USER ATTEMPTS TO SUBMIT AND/OR TO TRANSMIT COMMUNICATION DATA OPERATION 407 a user attempts to submit data and/or transmit communication data by instant messaging. In one embodiment, at A USER ATTEMPTS TO SUBMIT AND/OR TO TRANSMIT COMMUNICATION DATA OPERATION 407 a user attempts to submit data and/or transmit communication data to a Usenet newsgroup. In one embodiment, at A USER ATTEMPTS TO SUBMIT AND/OR TO TRANSMIT COMMUNICATION DATA OPERATION 407 a user attempts to submit data and/or transmit communication data via a Web search engine. In one embodiment, at A USER ATTEMPTS TO SUBMIT AND/OR TO TRANSMIT COMMUNICATION DATA OPERATION 407 a user attempts to submit data and/or transmit communication data to a blog. In one embodiment, at A USER ATTEMPTS TO SUBMIT AND/OR TO TRANSMIT COMMUNICATION DATA OPERATION 407 a user attempts to submit data and/or transmit communication data to wiki. In one embodiment, at A USER ATTEMPTS TO SUBMIT AND/OR TO TRANSMIT COMMUNICATION DATA OPERATION 407 a user attempts to submit data and/or transmit communication data to on-line classified ads. In one embodiment, at A USER ATTEMPTS TO SUBMIT AND/OR TO TRANSMIT COMMUNICATION DATA OPERATION 407 a user attempts to submit data and/or transmit communication data to a mobile phone messaging system. In one embodiment, at A USER ATTEMPTS TO SUBMIT AND/OR TO TRANSMIT COMMUNICATION DATA OPERATION 407 a user attempts to submit data and/or transmit communication data to an Internet forum. In one embodiment, at A USER ATTEMPTS TO SUBMIT AND/OR TO TRANSMIT COMMUNICATION DATA OPERATION 407 a user attempts to submit data and/or transmit communication data via fax transmissions. In one embodiment, at A USER ATTEMPTS TO SUBMIT AND/OR TO TRANSMIT COMMUNICATION DATA OPERATION 407 a user attempts to submit data and/or transmit communication data to a file sharing network.

In other embodiments, at A USER ATTEMPTS TO SUBMIT AND/OR TO TRANSMIT COMMUNICATION DATA OPERATION 407 a user attempts to submit data and/or transmit communication data by any means discussed herein, and/or known in the art at the time of filing, and/or as developed after the time of filing and/or to any communication system discussed herein, and/or known in the art at the time of filing, and/or as developed after the time of filing.

In one embodiment, once a user attempts to submit data and/or transmit communication data via any user computing system and/or server system, as discussed herein, and/or known in the art at the time of filing, and/or as developed after the time of filing, and/or using any network or network system as discussed herein, and/or known in the art at the time of filing, and/or as developed after the time of filing at A USER ATTEMPTS TO SUBMIT AND/OR TO TRANSMIT COMMUNICATION DATA OPERATION 407 process flow proceeds to TRANSMIT A GIVEN ONE OF THE ONE OR MORE DYNAMIC VERIFICATION IMAGES TO THE USER ALONG WITH INSTRUCTIONS OPERATION 409.

In one embodiment, at TRANSMIT A GIVEN ONE OF THE ONE OR MORE DYNAMIC VERIFICATION IMAGES TO THE USER ALONG WITH INSTRUCTIONS OPERATION 409, in response to the user's attempt to submit data and/or transmit data via any user computing system and/or server system of A USER ATTEMPTS TO SUBMIT AND/OR TO TRANSMIT COMMUNICATION DATA OPERATION 407, a given one of the one or more dynamic verification images of GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is selected and sent as data to the user via any provider computing system and/or server system, as discussed herein, and/or as known in the art at the time of filing, and/or as developed after the time of filing.

In one embodiment, at TRANSMIT A GIVEN ONE OF THE ONE OR MORE DYNAMIC VERIFICATION IMAGES TO THE USER ALONG WITH INSTRUCTIONS OPERATION 409 a given one of the one or more dynamic verification images is randomly selected and sent as data to the user via any provider computing system and/or server system, as discussed herein, and/or as known in the art at the time of filing, and/or as developed after the time of filing, using any network as discussed herein, and/or as known in the art at the time of filing, and/or as developed after the time of filing.

In one embodiment, at TRANSMIT A GIVEN ONE OF THE ONE OR MORE DYNAMIC VERIFICATION IMAGES TO THE USER ALONG WITH INSTRUCTIONS OPERATION 409 the given dynamic verification image is displayed to the user, along with any instructions, on a display device associated with any user computing system as discussed herein, and/or as known in the art at the time of filing, and/or as developed after the time of filing.

As a specific example, in one embodiment, at TRANSMIT A GIVEN ONE OF THE ONE OR MORE DYNAMIC VERIFICATION IMAGES TO THE USER ALONG WITH INSTRUCTIONS OPERATION 409 a dynamic verification image is displayed to the user via a GAF animation or motion picture shown on any user computing system as discussed herein, and/or as known in the art at the time of filing, and/or as developed after the time of filing.

In one embodiment, at TRANSMIT A GIVEN ONE OF THE ONE OR MORE DYNAMIC VERIFICATION IMAGES TO THE USER ALONG WITH INSTRUCTIONS OPERATION 409 the user is provided instructions and/or asked to submit a response that describes the pictorial image and/or the animation shown by the given dynamic verification image and/or, in one embodiment, to respond to the given dynamic verification image in a manner appropriate to the given dynamic verification image, using a user interface device such as, but not limited to: a keyboard; such as keyboard 107 of FIG. 2; a mouse, such as mouse 111 of FIG. 2; a touchpad; voice recognition software; or any other device and/or system capable of providing user input to a computing system and/or for translating user actions into computing system operations, whether available or known at the time of filing or as developed later.

As an example, recall that, in one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is a pictorial image. In this instance, at TRANSMIT A GIVEN ONE OF THE ONE OR MORE DYNAMIC VERIFICATION IMAGES TO THE USER ALONG WITH INSTRUCTIONS OPERATION 409 the user is instructed to describe the dynamic verification image. Further recall that the dynamic verification image chosen can be any dynamic verification image desired that is subject to human description. However, in one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is pictorial and not symbolic in nature. That is to say, the dynamic verification image is illustrative and conveys information by likeness to an entity or object and not by letters or numbers representing an object, or that are the object and/or image.

As another example, recall that, in one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is an animated dynamic verification image showing a given image in some form of action, such as, but not limited to: a moving animal, such as a running horse, a swimming fish, a charging bull, or a flying bird; a moving object, such as a rotating globe, a flying airplane, a car driving down a road; a human activity, such as a swimming man, a dancing woman, a crawling baby, or a child riding a bike; or any other animated dynamic verification image that depicts an entity and/or object doing something that is a readily recognized action and that can be readily described by a human being/user. In these embodiments, at TRANSMIT A GIVEN ONE OF THE ONE OR MORE DYNAMIC VERIFICATION IMAGES TO THE USER ALONG WITH INSTRUCTIONS OPERATION 409 the user is instructed to describe the dynamic verification image and/or the action taking place in the dynamic verification image.

As another example, recall that, in one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is made up of two or more sub-images of different items, such as, but not limited to: a set of two or more different animals; a set of two or more different fruits; a set of two or more different colored balls; or any other set of two or more sub-images that can be readily identified and are distinguishable from each other. In these embodiments, at TRANSMIT A GIVEN ONE OF THE ONE OR MORE DYNAMIC VERIFICATION IMAGES TO THE USER ALONG WITH INSTRUCTIONS OPERATION 409 the user is instructed to select a specific image from the displayed set of images.

As another example, recall that, in one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is one or more images that require, or are susceptible to, an appropriate user action specific to the given dynamic verification image. For instance, in one embodiment, the dynamic verification image is a light switch and at TRANSMIT A GIVEN ONE OF THE ONE OR MORE DYNAMIC VERIFICATION IMAGES TO THE USER ALONG WITH INSTRUCTIONS OPERATION 409 the user is instructed to activate the light switch using a user interface device such as, but not limited to: a keyboard; such as keyboard 107 of FIG. 2; a mouse, such as mouse 111 of FIG. 2; a touchpad; voice recognition software; or any other device and/or system capable of providing user input to a computing system and/or for translating user actions into computing system operations, whether available or known at the time of filing or as developed later.

Returning to FIG. 4, as another example, in one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is a doorbell and at TRANSMIT A GIVEN ONE OF THE ONE OR MORE DYNAMIC VERIFICATION IMAGES TO THE USER ALONG WITH INSTRUCTIONS OPERATION 409 the user is instructed to ring the doorbell using a user interface device such as, but not limited to: a keyboard; such as keyboard 107 of FIG. 2; a mouse, such as mouse 111 of FIG. 2; a touchpad; voice recognition software; or any other device and/or system capable of providing user input to a computing system and/or for translating user actions into computing system operations, whether available or known at the time of filing or as developed later.

Returning to FIG. 4, as another example, in one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is an image of a lock and an image of a key and at TRANSMIT A GIVEN ONE OF THE ONE OR MORE DYNAMIC VERIFICATION IMAGES TO THE USER ALONG WITH INSTRUCTIONS OPERATION 409 the user is instructed to position the image of the key in the image of the lock using a user interface device such as, but not limited to: a keyboard; such as keyboard 107 of FIG. 2; a mouse, such as mouse 111 of FIG. 2; a touchpad; voice recognition software; or any other device and/or system capable of providing user input to a computing system and/or for translating user actions into computing system operations, whether available or known at the time of filing or as developed later.

Returning to FIG. 4, as another example, in one embodiment, the dynamic verification image generated at GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is musical instrument, such as a guitar, and at TRANSMIT A GIVEN ONE OF THE ONE OR MORE DYNAMIC VERIFICATION IMAGES TO THE USER ALONG WITH INSTRUCTIONS OPERATION 409 the user is instructed to make a motion of playing the instrument using a user interface device such as, but not limited to: a keyboard; such as keyboard 107 of FIG. 2; a mouse, such as mouse 111 of FIG. 2; a touchpad; voice recognition software; or any other device and/or system capable of providing user input to a computing system and/or for translating user actions into computing system operations, whether available or known at the time of filing or as developed later.

Returning to FIG. 4, as a more specific example, in one embodiment, at TRANSMIT A GIVEN ONE OF THE ONE OR MORE DYNAMIC VERIFICATION IMAGES TO THE USER ALONG WITH INSTRUCTIONS OPERATION 409, the user is shown a dynamic verification image that is a red ball bouncing. In one embodiment, at TRANSMIT A GIVEN ONE OF THE ONE OR MORE DYNAMIC VERIFICATION IMAGES TO THE USER ALONG WITH INSTRUCTIONS OPERATION 409 the user is then asked/instructed to indicate what they are viewing.

In one embodiment, once, in response to the user's attempt to submit data and/or transmit data via any user computing system and/or server system of A USER ATTEMPTS TO SUBMIT AND/OR TO TRANSMIT COMMUNICATION DATA OPERATION 407, a given one of the one or more dynamic verification images of GENERATE ONE OR MORE DYNAMIC VERIFICATION IMAGES AND DATA REPRESENTING CORRECT RESPONSES TO EACH OF THE ONE OR MORE DYNAMIC VERIFICATION IMAGES OPERATION 403 is selected and sent as data to the user via any provider computing system and/or server system, as discussed herein, and/or as known in the art at the time of filing, and/or as developed after the time of filing at TRANSMIT A GIVEN ONE OF THE ONE OR MORE DYNAMIC VERIFICATION IMAGES TO THE USER ALONG WITH INSTRUCTIONS OPERATION 409, process flow proceeds to THE USER SUBMITS A RESPONSE TO THE GIVEN DYNAMIC VERIFICATION IMAGE OPERATION 411.

In one embodiment, at THE USER SUBMITS A RESPONSE TO THE GIVEN DYNAMIC VERIFICATION IMAGE OPERATION 411 data representing the user's submitted response, made in accordance with the instructions of TRANSMIT A GIVEN ONE OF THE ONE OR MORE DYNAMIC VERIFICATION IMAGES TO THE USER ALONG WITH INSTRUCTIONS OPERATION 409, that describes the pictorial image and/or the animation shown by the given dynamic verification image and/or, in one embodiment, the user's response to the given dynamic verification image that is appropriate to the given dynamic verification image, is obtained by any provider computing system and/or server system, as discussed herein, and/or as known in the art at the time of filing, and/or as developed after the time of filing.

In one embodiment, at THE USER SUBMITS A RESPONSE TO THE GIVEN DYNAMIC VERIFICATION IMAGE OPERATION 411 data representing the user's submitted response that describes the pictorial image and/or the animation shown by the given dynamic verification image and/or, in one embodiment, the user's response to the given dynamic verification image that is appropriate to the given dynamic verification image, is obtained by any provider computing system and/or server system, as discussed herein, and/or as known in the art at the time of filing, and/or as developed after the time of filing, using any network as discussed herein, and/or as known in the art at the time of filing, and/or as developed after the time of filing.

In one embodiment, once data representing the user's submitted response, made in accordance with the instructions of TRANSMIT A GIVEN ONE OF THE ONE OR MORE DYNAMIC VERIFICATION IMAGES TO THE USER ALONG WITH INSTRUCTIONS OPERATION 409, that describes the pictorial image and/or the animation shown by the given dynamic verification image and/or, in one embodiment, the user's response to the given dynamic verification image that is appropriate to the given dynamic verification image, is obtained by any provider computing system and/or server system, as discussed herein, and/or as known in the art at the time of filing, and/or as developed after the time of filing at THE USER SUBMITS A RESPONSE TO THE GIVEN DYNAMIC VERIFICATION IMAGE OPERATION 411, process flow proceeds to ANALYZE THE DATA REPRESENTING USER'S RESPONSE TO THE GIVEN DYNAMIC VERIFICATION IMAGE USING THE DATA REPRESENTING THE CORRECT RESPONSE TO THE GIVEN DYNAMIC VERIFICATION IMAGE OPERATION 415.

In one embodiment, at ANALYZE THE DATA REPRESENTING USER'S RESPONSE TO THE GIVEN DYNAMIC VERIFICATION IMAGE USING THE DATA REPRESENTING THE CORRECT RESPONSE TO THE GIVEN DYNAMIC VERIFICATION IMAGE OPERATION 415 the data representing the user's submitted response of RECEIVE DATA REPRESENTING THE USER'S RESPONSE TO THE GIVEN DYNAMIC VERIFICATION IMAGE OPERATION 413 that describes the pictorial image and/or the animation shown by the given dynamic verification image and/or, in one embodiment, the user's response to the given dynamic verification image that is appropriate to the given dynamic verification image, and the data representing the list of correct responses for the given dynamic verification image of STORE DATA REPRESENTING THE GENERATED ONE OR MORE DYNAMIC VERIFICATION IMAGES AND THE DATA REPRESENTING CORRECT RESPONSES TO EACH OF THE ONE OR MORE DYNAMIC VERIFICATION IMAGES OPERATION 405 is analyzed and/or compared to determine the correctness of the user's response.

In one embodiment, at ANALYZE THE DATA REPRESENTING USER'S RESPONSE TO THE GIVEN DYNAMIC VERIFICATION IMAGE USING THE DATA REPRESENTING THE CORRECT RESPONSE TO THE GIVEN DYNAMIC VERIFICATION IMAGE OPERATION 415 the data representing the user's submitted response of RECEIVE DATA REPRESENTING THE USER'S RESPONSE TO THE GIVEN DYNAMIC VERIFICATION IMAGE OPERATION 413 that describes the pictorial image and/or the animation shown by the given dynamic verification image and/or, in one embodiment, the user's response to the given dynamic verification image that is appropriate to the given dynamic verification image, and the data representing the list of correct responses for the given dynamic verification image of STORE DATA REPRESENTING THE GENERATED ONE OR MORE DYNAMIC VERIFICATION IMAGES AND THE DATA REPRESENTING CORRECT RESPONSES TO EACH OF THE ONE OR MORE DYNAMIC VERIFICATION IMAGES OPERATION 405 is analyzed and/or compared to determine the correctness of the user's response using one or more processors, such as CPU(s) 101 and 151 of FIGS. 1, 2, and 3, associated with a computing system such as computing systems 100 and 150 of FIGS. 1, 2, and 3, and/or as otherwise discussed herein, and/or as known in the art at the time of filing, and/or as developed after the time of filing.

As noted above, in one embodiment, at ANALYZE THE DATA REPRESENTING USER'S RESPONSE TO THE GIVEN DYNAMIC VERIFICATION IMAGE USING THE DATA REPRESENTING THE CORRECT RESPONSE TO THE GIVEN DYNAMIC VERIFICATION IMAGE OPERATION 415, a level of match accuracy between the data representing the user's submitted response that describes the pictorial image and/or the animation shown by the given dynamic verification image and/or, in one embodiment, the user's response to the given dynamic verification image that is appropriate to the given dynamic verification image, and the data representing the list of correct responses for the given dynamic verification image is determined.

As also noted above, in one embodiment, at ANALYZE THE DATA REPRESENTING USER'S RESPONSE TO THE GIVEN DYNAMIC VERIFICATION IMAGE USING THE DATA REPRESENTING THE CORRECT RESPONSE TO THE GIVEN DYNAMIC VERIFICATION IMAGE OPERATION 415, a level of match accuracy between the data representing the user's submitted response that describes the pictorial image and/or the animation shown by the given dynamic verification image and/or, in one embodiment, the user's response to the given dynamic verification image that is appropriate to the given dynamic verification image, and the data representing the list of correct responses for the given dynamic verification image is established and is editable by the provider of process for providing a dynamic image verification system to confirm human input 400.

In one embodiment, once the data representing the user's submitted response of RECEIVE DATA REPRESENTING THE USER'S RESPONSE TO THE GIVEN DYNAMIC VERIFICATION IMAGE OPERATION 413 that describes the pictorial image and/or the animation shown by the given dynamic verification image and/or, in one embodiment, the user's response to the given dynamic verification image that is appropriate to the given dynamic verification image, and the data representing the list of correct responses for the given dynamic verification image of STORE DATA REPRESENTING THE GENERATED ONE OR MORE DYNAMIC VERIFICATION IMAGES AND THE DATA REPRESENTING CORRECT RESPONSES TO EACH OF THE ONE OR MORE DYNAMIC VERIFICATION IMAGES OPERATION 405 is analyzed and/or compared to determine the correctness of the user's response at ANALYZE THE DATA REPRESENTING USER'S RESPONSE TO THE GIVEN DYNAMIC VERIFICATION IMAGE USING THE DATA REPRESENTING THE CORRECT RESPONSE TO THE GIVEN DYNAMIC VERIFICATION IMAGE OPERATION 415, process flow proceeds to BASED, AT LEAST IN PART, ON THE ANALYSIS OF THE USER'S RESPONSE, MAKE A DETERMINATION WHETHER TO ALLOW THE USER TO SUBMIT AND/OR TRANSMIT THE COMMUNICATION DATA OPERATION 417.

In one embodiment, at BASED, AT LEAST IN PART, ON THE ANALYSIS OF THE USER'S RESPONSE, MAKE A DETERMINATION WHETHER TO ALLOW THE USER TO SUBMIT AND/OR TRANSMIT THE COMMUNICATION DATA OPERATION 417 a determination is then made as to whether or not to allow the user to submit the data and/or transmit the communication data of A USER ATTEMPTS TO SUBMIT AND/OR TO TRANSMIT COMMUNICATION DATA OPERATION 407 via any user computing system and/or server system based, at least in part on the level of match accuracy determined at ANALYZE THE DATA REPRESENTING USER'S RESPONSE TO THE GIVEN DYNAMIC VERIFICATION IMAGE USING THE DATA REPRESENTING THE CORRECT RESPONSE TO THE GIVEN DYNAMIC VERIFICATION IMAGE OPERATION 415 between the data representing the user's submitted response that describes the pictorial image and/or the animation shown by the given dynamic verification image and/or, in one embodiment, the user's response to the given dynamic verification image that is appropriate to the given dynamic verification image of RECEIVE DATA REPRESENTING THE USER'S RESPONSE TO THE GIVEN DYNAMIC VERIFICATION IMAGE OPERATION 413, and the data representing the list of correct responses for the given dynamic verification image of STORE DATA REPRESENTING THE GENERATED ONE OR MORE DYNAMIC VERIFICATION IMAGES AND THE DATA REPRESENTING CORRECT RESPONSES TO EACH OF THE ONE OR MORE DYNAMIC VERIFICATION IMAGES OPERATION 405.

In one embodiment, once a determination is then made as to whether or not to allow the user to submit data and/or transmit the communication data of A USER ATTEMPTS TO SUBMIT AND/OR TO TRANSMIT COMMUNICATION DATA OPERATION 407 via any user computing system and/or server system based, at least in part on the level of match accuracy determined at ANALYZE THE DATA REPRESENTING USER'S RESPONSE TO THE GIVEN DYNAMIC VERIFICATION IMAGE USING THE DATA REPRESENTING THE CORRECT RESPONSE TO THE GIVEN DYNAMIC VERIFICATION IMAGE OPERATION 415 between the data representing the user's submitted response that describes the pictorial image and/or the animation shown by the given dynamic verification image and/or, in one embodiment, the user's response to the given dynamic verification image that is appropriate to the given dynamic verification image of RECEIVE DATA REPRESENTING THE USER'S RESPONSE TO THE GIVEN DYNAMIC VERIFICATION IMAGE OPERATION 413, and the data representing the list of correct responses for the given dynamic verification image of STORE DATA REPRESENTING THE GENERATED ONE OR MORE DYNAMIC VERIFICATION IMAGES AND THE DATA REPRESENTING CORRECT RESPONSES TO EACH OF THE ONE OR MORE DYNAMIC VERIFICATION IMAGES OPERATION 405 at BASED, AT LEAST IN PART, ON THE ANALYSIS OF THE USER'S RESPONSE, MAKE A DETERMINATION WHETHER TO ALLOW THE USER TO SUBMIT AND/OR TRANSMIT THE COMMUNICATION DATA OPERATION 417, process flow proceeds to EXIT OPERATION 430. In one embodiment, at EXIT OPERATION 430, process for providing a dynamic image verification system to confirm human input 400 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing a dynamic image verification system to confirm human input 400, the dynamic verification image utilized does not rely on static symbols that can be captured and mapped to symbol identification databases by computing systems to generate automated responses. Consequently, using process for providing a dynamic image verification system to confirm human input 400, the dynamic verification image identification relies on human cognitive functions that cannot currently be mimicked by computing systems, programs, machines, or any currently available software. In addition, using process for providing a dynamic image verification system to confirm human input 400, the dynamic verification image is not language or alpha-numeric dependent, i.e., images and animations are universal and language independent. Consequently, process for providing a dynamic image verification system to confirm human input 400 is more effective at preventing spam than currently available systems that rely on static symbols.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "accessing", "analyzing", "generating", "storing", "saving", "displaying", "transmitting", "providing", "processing", "submitting", "selecting" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing a dynamic image verification system to confirm human input comprising the following of which a plurality are each executed via any set of one or more processors:
    generating a dynamic verification image, the dynamic verification image being an animated primarily pictorial representation of an object or entity performing an action;
    generating correct responses data representing one or more defined correct responses associated with the dynamic verification image, the one or more defined correct responses associated with the dynamic verification image describing the object or entity represented by the dynamic verification image or the action being performed by the object or entity in the dynamic verification image;
    establishing an editable level of match accuracy between response data and the correct responses data;
    receiving a request for permission to send information;
    responsive to the request, and prior to approval being provided to transmit the information, and prior to the information being transmitted:
        providing the dynamic verification image along with instructions;
        receiving response data representing a response associated with the dynamic verification image, the response associated with the dynamic verification image being a submitted manually described description of the dynamic verification image and being made in accordance with the instructions;
    analyzing the correct responses data, the response data, and the editable level of match accuracy; and
    making a determination, prior to transfer of the information, whether to allow or not allow a transfer of the information, the determination based at least in part on: the analysis of the correct responses data and the response data, whether the response data matches the correct responses data, and the editable level of match accuracy.

2. The computing system implemented process for providing a dynamic image verification system to confirm human input of claim 1, wherein
    the dynamic verification image is an animated visual representation of an object or entity performing an action selected from the group of objects or entities performing actions consisting of:
    an animated visual representation of an animal moving;
    an animated visual representation of a horse jumping;
    an animated visual representation of a fish swimming;
    an animated visual representation of a bull charging;
    an animated visual representation of a bird flying;
    an animated visual representation of an object in motion;
    an animated visual representation of a globe rotating;
    an animated visual representation of an airplane flying;
    an animated visual representation of a person running;
    an animated visual representation of a person walking;
    an animated visual representation of a person jumping;
    an animated visual representation of a person swimming;
    an animated visual representation of a person dancing; and
    an animated visual representation of a ball bouncing.

3. A system for providing a dynamic image verification system to confirm human input comprising:
    one or more processors; and
    one or more memories coupled to the one or more processors, the one or more memories having stored therein instructions which when executed by the one or more computing processors, perform a process comprising:
    generating a dynamic verification image, the dynamic verification image being an animated primarily pictorial visual representation of an object or entity performing an action;
    generating correct responses data representing one or more defined correct responses associated with the dynamic verification image, the one or more defined correct responses associated with the dynamic verification image describing the object or entity represented by the dynamic verification image or the action being performed by the object or entity in the dynamic verification image;
    establishing an editable level of match accuracy between response data and the correct responses data;
    receiving a request for permission to transmit information;
    responsive to the request, and prior to the information being transmitted:
        providing the dynamic verification image along with instructions;
        receiving response data representing a response associated with the dynamic verification image, the response associated with the dynamic verification image being a submitted manually described description of the dynamic verification image or the action being performed by the object or entity in the dynamic verification image and being made in accordance with the instructions;

analyzing the correct responses data, the response data, and the editable level of match accuracy; and making a determination, prior to transfer of the information, whether to allow or not allow a transfer of the information, the determination based at least in part on: the analysis of the correct responses data, the response data and whether the response data matches correct responses data, and the editable level of match accuracy.

4. The system for providing a dynamic image verification system to confirm human input of claim 3, wherein the dynamic verification image is an animated visual representation of an object or entity performing an action selected from the group of objects or entities performing actions consisting of:

an animated visual representation of an animal moving;
an animated visual representation of a horse jumping;
an animated visual representation of a fish swimming;
an animated visual representation of a bull charging;
an animated visual representation of a bird flying;
an animated visual representation of an object in motion;
an animated visual representation of a globe rotating;
an animated visual representation of an airplane flying;
an animated visual representation of a person running;
an animated visual representation of a person walking;
an animated visual representation of a person jumping;
an animated visual representation of a person swimming;
an animated visual representation of a person dancing; and
an animated visual representation of a ball bouncing.

\* \* \* \* \*